US012783254B2

(12) United States Patent
Han et al.

(10) Patent No.: US 12,783,254 B2
(45) Date of Patent: Nov. 3, 2026

(54) SERVER BOOT AND OPERATION METHOD AND APPARATUS, SERVER, AND STORAGE MEDIUM

(71) Applicant: Suzhou MetaBrain Intelligent Technology Co., Ltd., Suzhou (CN)

(72) Inventors: Yanyan Han, Suzhou (CN); Bin Liu, Suzhou (CN); Dexin Li, Suzhou (CN); Mingyuan Lu, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/142,724

(22) PCT Filed: Sep. 30, 2024

(86) PCT No.: PCT/CN2024/122656
§ 371 (c)(1),
(2) Date: Jun. 24, 2025

(87) PCT Pub. No.: WO2025/118803
PCT Pub. Date: Jun. 12, 2025

(65) Prior Publication Data
US 2026/0119194 A1 Apr. 30, 2026

(30) Foreign Application Priority Data
Dec. 6, 2023 (CN) ......................... 202311660541.2

(51) Int. Cl.
*G06F 9/4401* (2018.01)

(52) U.S. Cl.
CPC .................................. *G06F 9/4416* (2013.01)

(58) Field of Classification Search
CPC ...... G06F 9/4416; G06F 9/4418; G06F 9/442; G06F 11/3051; G06F 13/105
See application file for complete search history.

(56) References Cited

U.S. PATENT DOCUMENTS 6,360,342 B1 * 3/2002 Lee ........................ G11C 29/26 714/733
10,088,869 B2 * 10/2018 Dees ..................... G06F 1/1632
(Continued)

FOREIGN PATENT DOCUMENTS

CN 101872307 A 10/2010
CN 105955822 A 9/2016
(Continued)

OTHER PUBLICATIONS

International Search Report of corresponding PCT application (PCT/CN2024/122656) Nov. 25, 2024, 7 pages.
(Continued)

*Primary Examiner* — Hyun Soo Kim
(74) *Attorney, Agent, or Firm* — COOPER LEGAL GROUP LLC

(57) ABSTRACT

Disclosed are a server boot and operation method and apparatus, a server, and a storage medium. The server boot and operation method includes: during a power-on self-test (POST) process of a server, loading an Option ROM of each target peripheral device according to a peripheral device loading sequence and by using a target configuration space; in response to detecting that the target configuration space is insufficient, detecting remaining spaces of other modules in a preset address space; and in response to determining that the remaining spaces meet a required space corresponding to the target configuration space, reallocating a preset address space to ensure that the reallocated configuration space for the peripheral device loading module is greater than or equal to a sum of the target configuration space and the required space.

17 Claims, 7 Drawing Sheets

(56) References Cited

U.S. PATENT DOCUMENTS

| | | | | |
|---|---|---|---|---|
| 2006/0047858 | A1* | 3/2006 | Atherton | G06F 9/4411 710/1 |
| 2008/0022033 | A1* | 1/2008 | Atherton | G06F 12/0623 711/E12.005 |
| 2013/0080754 | A1* | 3/2013 | Ganesh | G06F 9/4403 713/2 |
| 2015/0281370 | A1* | 10/2015 | Yasaki | H04L 69/329 709/228 |
| 2016/0261455 | A1* | 9/2016 | Su | H04L 41/069 |
| 2021/0405873 | A1* | 12/2021 | Lu | G06F 3/0679 |
| 2023/0117996 | A1* | 4/2023 | Qiu | G06F 11/1417 714/16 |

FOREIGN PATENT DOCUMENTS

| | | | |
|---|---|---|---|
| CN | 108804230 | A | 11/2018 |
| CN | 111045819 | A | 4/2020 |
| CN | 116048643 | A | 5/2023 |
| CN | 116346781 | A | 6/2023 |
| CN | 116382913 | A | 7/2023 |
| CN | 117369891 | A | 1/2024 |

OTHER PUBLICATIONS

Written Opinion of International Searching Authority of corresponding PCT application (PCT/CN2024/122656) Nov. 25, 2024, 9 pages.

First Office Action of corresponding CN priority application (CN202311660541.2) Jan. 11, 2024, 11 pages.

Notification to Grant Patent Right for Invention of corresponding CN priority application (CN202311660541.2) Feb. 4, 2024, 2 pages.

* cited by examiner

SERVER BOOT AND OPERATION METHOD AND APPARATUS, SERVER, AND STORAGE MEDIUM

CROSS-REFERENCE TO RELATED APPLICATION

This application claims priority to Chinese Patent Application No. 202311660541.2, filed on Dec. 6, 2023 in China National Intellectual Property Administration and entitled "Server Boot and Operation Method and Apparatus, Server, and Medium", which is hereby incorporated by reference in its entirety.

FIELD

The present application relates to the technical field of servers, in particular to a server boot and operation method and apparatus, a server, and a storage medium.

BACKGROUND

A basic input output system (BIOS) is a set of programs embedded in a read-only memory (ROM) located on a motherboard of a computer. BIOS stores most important programs for basic input and output operations, system configuration information, a power-on self-test (POST) routine, and a system bootstrapping program, known as a Legacy boot mode (conventional boot mode).

In the conventional boot mode, resources are allocated among various components of a server, and available resources of the server are subject to certain spatial limitations. Boot options and peripheral devices consume different types of resources. Among these, the loading of an Option ROM (OPROM, an expansion memory) of a peripheral device is a critical step in an overall resource loading process, as it determines whether the peripheral device may function properly. Different peripheral devices require different amounts of OPROM resources. When a large number of peripheral devices are present, insufficient OPROM resource allocation may occur, thereby affecting the normal operation of the peripheral devices.

SUMMARY

To address the above technical problem, the present application provides a server boot and operation method, including:

during a power-on self-test (POST) process of a server, loading an Option ROM of each target peripheral device according to a peripheral device loading sequence and by using a target configuration space, where the target configuration space refers to a configuration space allocated to a peripheral device loading module in a preset address space, and the target peripheral devices refer to peripheral devices, among all peripheral devices connected to the server, that correspond to the peripheral device loading sequence;

in response to detecting that the target configuration space is insufficient, detecting remaining spaces of other modules in the preset address space; and in response to determining that the remaining spaces meet a required space corresponding to the target configuration space, reallocating the preset address space to ensure that the reallocated configuration space for the peripheral device loading module is greater than or equal to a sum of the target configuration space and the required space, where the required space refers to an address space needed by the target peripheral devices that have not yet been loaded.

In some embodiments, after the detecting remaining spaces of other modules in the preset address space, the method further includes:

in response to determining that the remaining spaces do not meet a required space, displaying a configuration environment interface; and performing a corresponding operation based on a configuration control command triggered by the configuration environment interface, where the configuration control command includes at least one of: a shutdown command, a continue boot command, and a peripheral device reload command.

In some embodiments, before the displaying a configuration environment interface, the method further includes:

acquiring an insufficient space control command;

in response to determining that the insufficient space control command is an entry configuration environment command, performing a step of displaying a configuration environment interface;

in response to determining that the insufficient space control command is a shutdown command, controlling the server to shut down; or in response to determining that the insufficient space control command is a continue boot command, abandoning unloaded peripheral devices and continuing a subsequent POST process.

In some embodiments, the acquiring an insufficient space control command includes:

generating an insufficient space control command based on priority information of unloaded target peripheral devices in peripheral device priority information, where the peripheral device priority information includes priority information of various types of peripheral devices connected to the server.

In some embodiments, the displaying a configuration environment interface includes:

displaying the configuration environment interface on a remote terminal via a baseboard management controller.

In some embodiments, the configuration environment interface includes a loaded peripheral device list and an unloaded peripheral device list. The loaded peripheral device list includes device information and Option ROM size information of loaded peripheral devices.

In some embodiments, when the configuration control command includes a peripheral device reload command, the peripheral device reload command includes information of peripheral devices to be loaded and information of peripheral devices to be discarded. The information of peripheral devices to be discarded includes device information of loaded peripheral devices.

In some embodiments, the performing a corresponding operation based on the configuration control command triggered by the configuration environment interface includes:

in response to determining that the configuration control command is a peripheral device reload command, reloading the Option ROM in the target configuration space according to the information of peripheral devices to be loaded and the information of peripheral devices to be discarded; and in response to determining that the target configuration space is insufficient during a reloading process, abandoning unloaded peripheral devices and continuing the subsequent POST process.

In some embodiments, after the reallocating a preset address space to ensure that the reallocated configuration space for the peripheral device loading module is greater than or equal to a sum of the target configuration space and the required space, the method further includes:

in response to detecting that the reallocated configuration space for the peripheral device loading module is insufficient, displaying a configuration environment interface; and performing a corresponding operation based on the configuration control command triggered by the configuration environment interface, where the configuration control command includes at least one of: a shutdown command, a continue boot command, and a peripheral device reload command.

In some embodiments, the reallocating a preset address space to ensure that the reallocated configuration space for the peripheral device load module is greater than or equal to a sum of the target configuration space and the required space includes:

reallocating a preset address space to ensure that the reallocated configuration space for the peripheral device loading module is equal to a sum of the target configuration space and the remaining spaces.

In some embodiments, before the during a power-on self-test (POST) process of a server, loading an Option ROM of each target peripheral device according to a peripheral device loading sequence and by using a target configuration space, the method includes:

determining the peripheral device loading sequence based on peripheral device priority information, where the peripheral device priority information includes priority information of various types of peripheral devices connected to the server; and loading an Option ROM of each target peripheral device according to the peripheral device loading sequence and by using the target configuration space.

In some embodiments, before the determining the peripheral device loading sequence based on peripheral device priority information, the method further includes:

determining a target model of the server based on acquired model information of the server, where the target model of the server is any preset model, including a computer model and a storage model; and determining preset priority information corresponding to the target model of the server as peripheral device priority information.

In some embodiments, the determining a target model of the server based on acquired the model information of the server further includes:

acquiring service scenario information of the server; and determining the target model of the server based on the model information and the service scenario information.

In some embodiments, before the determining preset priority information corresponding to the target model of the server as peripheral device priority information, the method further includes:

acquiring requirements of the target model of the server for peripheral devices; and determining preset priority information corresponding to the target model of the server based on the requirements.

In some embodiments, priority information of various types of peripheral devices connected to the server includes priority information of each device type to be loaded, as well as information of each device type to be disabled.

In some embodiments, before the during a power-on self-test (POST) process of a server, loading an Option ROM of each target peripheral device according to a peripheral device loading sequence and by using a target configuration space, the method further includes:

in response to determining that the server is powered on, allocating the target configuration space for the peripheral device loading module according to a resource allocation method and by using the preset address space.

In some embodiments, after the during a power-on self-test (POST) process of a server, loading an Option ROM of each target peripheral device according to a peripheral device loading sequence and by using a target configuration space, the method further includes:

in response to not detecting that the target configuration space is insufficient, entering an operating system or a preboot execution environment.

The present application further provides a server boot and operation apparatus, including:

a loading unit, configured to, during a POST process of a server, load an Option ROM of each target peripheral device according to a peripheral device loading sequence and by using a target configuration space, where the target configuration space refers to a configuration space allocated to a peripheral device loading module in a preset address space, and the target peripheral devices refer to peripheral devices, among all peripheral devices connected to the server, that correspond to the peripheral device loading sequence;

a detection unit, configured to, in response to detecting that the target configuration space is insufficient, detect remaining spaces of other modules in the preset address space; and a reallocation unit, configured to, in response to determining that the remaining spaces meet a required space corresponding to the target configuration space, reallocate a preset address space to ensure that the reallocated configuration space for the peripheral device loading module is greater than or equal to a sum of the target configuration space and the required space, where the required space refers to an address space needed by the target peripheral devices that have not yet been loaded.

The present application further provides a server, including:

one or more processors; and a memory associated with the one or more processors, the memory being configured to store computer-readable instructions which, when executed by the one or more processors, implement the steps of the server boot and operation method as described above.

Additionally, the present application further provides a non-transitory computer-readable storage medium. The non-transitory computer-readable storage medium stores computer-readable instructions which, when executed by one or more processors, implement the steps of the server boot and operation method as described above.

The server boot and operation method provided in the present application includes:

during the POST process of the server, loading the Option ROM of each target peripheral device according to the peripheral device loading sequence and by using the target configuration space, where the target configuration space refers to the configuration space allocated to the peripheral device loading module in the preset address space, and the target peripheral devices refer to the peripheral devices, among all peripheral devices connected to the server, that correspond to the peripheral device loading sequence; in response to detecting that the target configuration space is insufficient, detecting the remaining spaces of other modules in the preset address space; and in response to determining that the remaining spaces meet the required space corresponding to the target configuration space, reallocating the preset address space to ensure that the reallocated configuration space for the peripheral device loading module is greater than or equal to the sum of the target configuration space and the required space, where the required space refers to the address space needed by the target peripheral devices that have not yet been loaded.

BRIEF DESCRIPTION OF THE DRAWINGS

In order to describe the embodiments of the present application or the technical solutions in the existing art more clearly, drawings required to be used in the embodiments or the illustration of the existing art will be briefly introduced below. Apparently, the drawings in the illustration below are some embodiments of the present application. Those ordinarily skilled in the art also may obtain other drawings according to the provided drawings without creative work.

DETAILED DESCRIPTION

In order to make objectives, technical solutions, and advantages of the embodiments of the present application clearer, the technical solutions in the embodiments of the present application will be described clearly and completely below with reference to the accompanying drawings. Apparently, the described embodiments are only part of the embodiments of the present application, rather than all of them. Based on the embodiments in the present application, all other embodiments obtained by those of ordinary skill in the art without creative efforts shall fall within the scope of protection of the present application.

Figure 1:
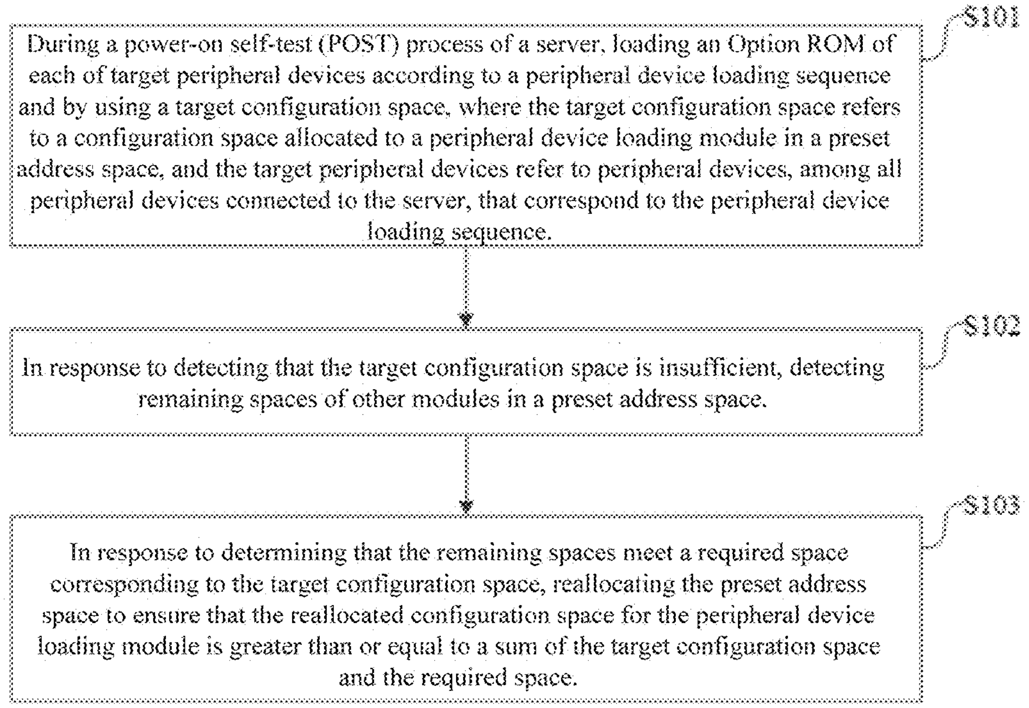
FIG. 1 is a flow chart of a server boot and operation method provided by some embodiments of the present application.

Refer to FIG. 1, which is a flow chart of a server boot and operation method provided by some embodiments of the present application. The method may include:

Step 101: During a power-on self-test (POST) process of a server, loading an Option ROM of each of target peripheral devices according to a peripheral device loading sequence and by using a target configuration space, where the target configuration space refers to a configuration space allocated to a peripheral device loading module in a preset address space, and the target peripheral devices refer to peripheral devices, among all peripheral devices connected to the server, that correspond to the peripheral device loading sequence.

It should be understood that in the present embodiment, the server, upon power-on and startup, may perform a POST process under a Legacy boot mode of a basic input/output system (BIOS). During a POST process, the BIOS may allocate a necessary internal memory resource (i.e., the configuration space) to each module (such as a boot item loading module and a peripheral device loading module) by partitioning a fixed-size address space (i.e., a preset address space) according to a standard resource allocation method, thereby ensuring that different modules may be properly loaded and utilized during normal operation of the server. The peripheral device loading module may be configured to, within an allocated configuration space (i.e., a target space), load and copy an Option ROM of each target peripheral device in the peripheral device loading sequence. The present embodiment does not limit a size of the preset address space. For example, the preset address space may be the conventionally designated 1 MB address space under the Legacy boot mode (such as 1 MB address space shown in FIG. 2).

Correspondingly, the peripheral device loading sequence in this step refers to a sequence in which peripheral devices are loaded. The target peripheral devices in this step refer to peripheral devices included in the peripheral device loading sequence among all the peripheral devices connected to the server. The target peripheral devices may be all or part of the peripheral devices connected to the server. In this embodiment, the peripheral devices may include peripheral component interconnect express (PCIe) devices, which are supported by a PCIe standard, a high-speed serial computer expansion bus standard. A peripheral device typically includes a plurality of components, one of which may be an Option ROM (OPROM, i.e., an expansion memory). During a POST process, the BIOS may scan PCIe devices for the presence of Option ROMs and, if the Option ROMs present, copy them into a designated internal memory (i.e., the target configuration space) for execution. The peripheral devices connected to the server may include various types of peripheral devices, such as video graphics array (VGA, a standard display interface), onboard network interface cards, add-in network interface cards, serial attached small computer system interface (SAS) cards, redundant array of independent disks (RAID) cards, onboard RAID controllers, Serial Over LAN (SOL, a specification for data packet format and protocol), and non-volatile memory express (NVMe, a host controller interface specification for a non-volatile memory) devices.

In this step, a method in which the server, using the BIOS, loads the Option ROM of each target peripheral device during a POST process according to the peripheral device loading sequence and by using the target configuration space may be set by designers based on practical scenarios and user requirements. For example, a method which is similar to or the same as a method used in the related technologies for loading an Option ROM of peripheral devices may be adopted. Furthermore, since a loading sequence of an Option ROM of the peripheral device is adjustable, in this step, the BIOS may determine the peripheral device loading sequence based on peripheral device priority information. The Option ROM of each target peripheral device may then be loaded according to the peripheral device loading sequence and by using target configuration space. The peripheral device priority information includes priority information of various types of peripheral devices connected to the server. By setting the peripheral device priority information, the loading sequence of the Option ROM of each peripheral device may better align with user needs. This is not limited in the present embodiment.

Step 102: In response to detecting that the target configuration space is insufficient, detecting remaining spaces of other modules in a preset address space.

In this step, when the BIOS detects that the target configuration space (such as the PCIe OPROM space shown in FIG. 2) is insufficient, that is, when the target configuration space may not load the Option ROMs of all target peripheral devices, it may detect the remaining spaces within the configuration space allocated to other modules (such as a boot item loading module) after corresponding content of the modules is loaded. These remaining spaces are exemplified as B1 and C1 in FIG. 2.

Step 103: In response to determining that the remaining spaces meet a required space corresponding to the target configuration space, reallocating the preset address space to ensure that the reallocated configuration space for the peripheral device loading module is greater than or equal to a sum of the target configuration space and the required space.

It may be understood that in this step, when the remaining spaces of other modules meet address spaces required by peripheral devices (i.e., the target peripheral devices), in the peripheral device loading sequence, which have not yet been loaded, the BIOS may reallocate a preset address space. This reallocation allows the peripheral device loading module to be reallocated with a configuration space greater than or equal to the sum of the target configuration space and the required space. In this way, the reallocated configuration space for the peripheral devices may meet the loading requirements of the Option ROMs of all peripheral devices in the loading sequence, thereby reducing the occurrence of peripheral device malfunction due to insufficient internal memory resources allocated to the Option ROMs of the peripheral devices under the Legacy boot mode.

Correspondingly, in this step, the method in which the BIOS reallocates the preset address space to ensure that the reallocated configuration space for the peripheral device loading module is greater than or equal to the sum of the target configuration space and the required space may be set by designers according to application scenarios and user requirements. For example, the BIOS may reallocate the preset address space to ensure that the reallocated configuration space for the peripheral device loading module is equal to the sum of the target configuration space and the required space. That is, other modules are reallocated configuration spaces equal to a difference between a previously allocated configuration space and the remaining spaces, whereby the entire remaining spaces of other modules are reallocated to the peripheral device loading module. In some embodiments, the BIOS may reallocate a portion of the remaining spaces of other modules to the peripheral device loading module. For example, when the reallocated configuration space for the peripheral device loading module is greater than or equal to the sum of the target configuration space and the required space, other modules with the remaining spaces may allocate a portion of the remaining spaces to the peripheral device loading module according to a certain ratio. This is not limited in the present embodiment.

Figure 2:
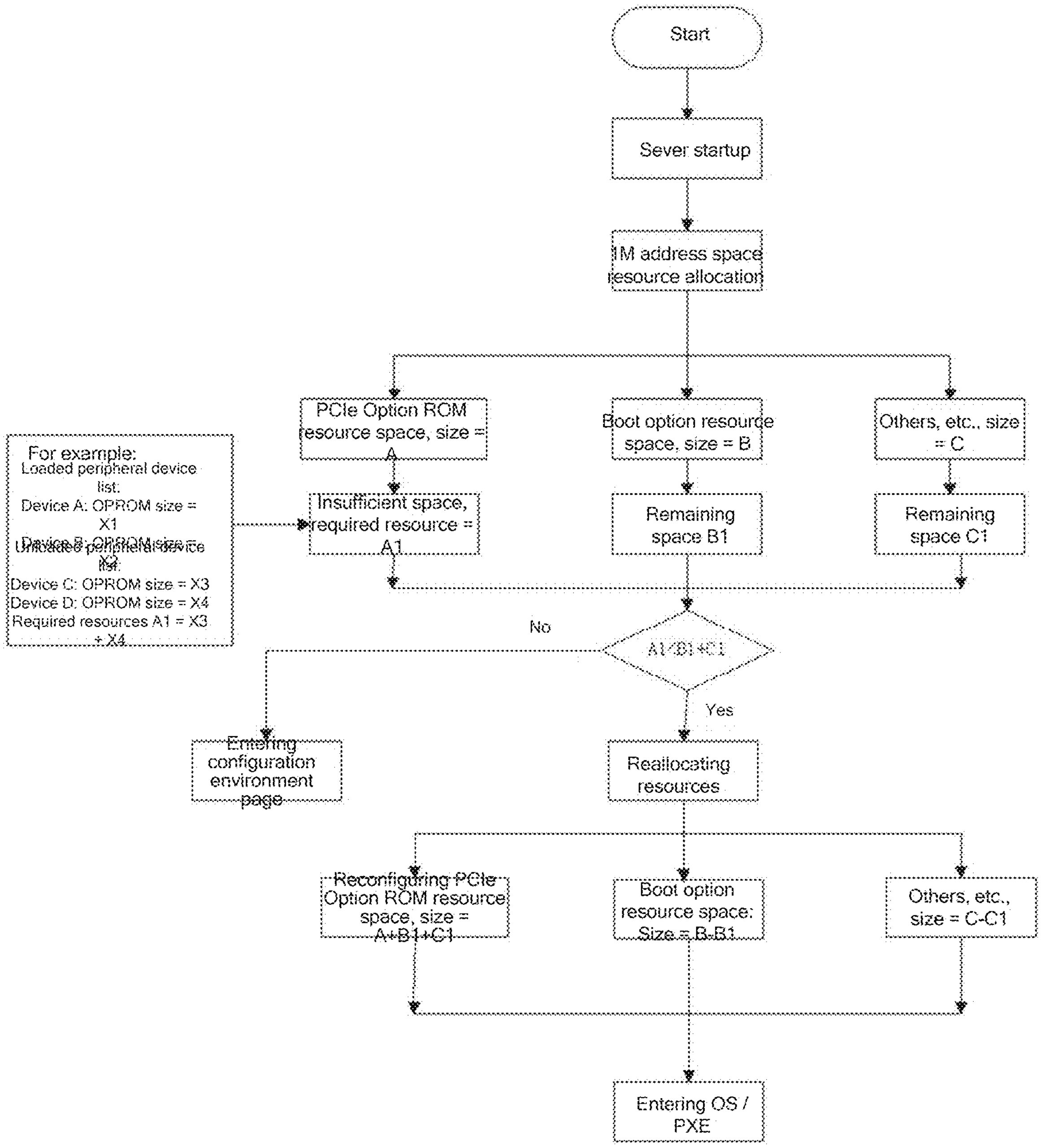
FIG. 2 is a schematic flow chart of another server boot and operation method provided by some embodiments of the present application.

It should be noted that before this step, the BIOS may also determine whether the remaining spaces meet the required space corresponding to the target configuration space. As shown in FIG. 2, the BIOS may determine whether the sum of the remaining spaces (B1+C1) exceeds the required space (A1). In response to determining that the sum of the remaining spaces (B1+C1) exceeds the required space (A1), the BIOS determines that the remaining spaces meet the required space corresponding to the target configuration space; and in response to determining that the sum of the remaining spaces (B1+C1) does not exceed the required space (A1), the BIOS determines that the remaining spaces do not meet the required space corresponding to the target configuration space.

Correspondingly, for a case where the remaining spaces do not meet the required space corresponding to the target configuration space in the present embodiment, designers may make customized settings according to practical application scenarios and user requirements. For example, methods which are identical or similar to those used in related technologies for handling insufficient space during loading of the Option ROM may be adopted, such as, directly shutting down or resuming the boot process. To better satisfy user needs, in this embodiment, in response to determining that the remaining spaces do not meet the required space corresponding to the target configuration space, the BIOS displays a configuration environment interface (such as a configuration environment page shown in FIG. 2) and then executes a corresponding operation based on a configuration control command triggered by the configuration environment interface. The configuration control command may include, but is not limited to, a shutdown command, a continue boot command, and a peripheral device reload command. In other words, a user or an administrator may trigger an appropriate control command by the configuration environment interface to control the subsequent boot process.

Correspondingly, in a case where the preset address space is reallocated to ensure than the reallocated configuration space for the peripheral device loading module is equal to a sum of the target configuration space and the required space, after the preset address space is reallocated, in response to detecting again that the reallocated configuration space for the peripheral device loading module is insufficient, the configuration environment interface may be displayed; and a corresponding operation may be executed based on the configuration control command triggered by the configuration environment interface.

Figure 3:
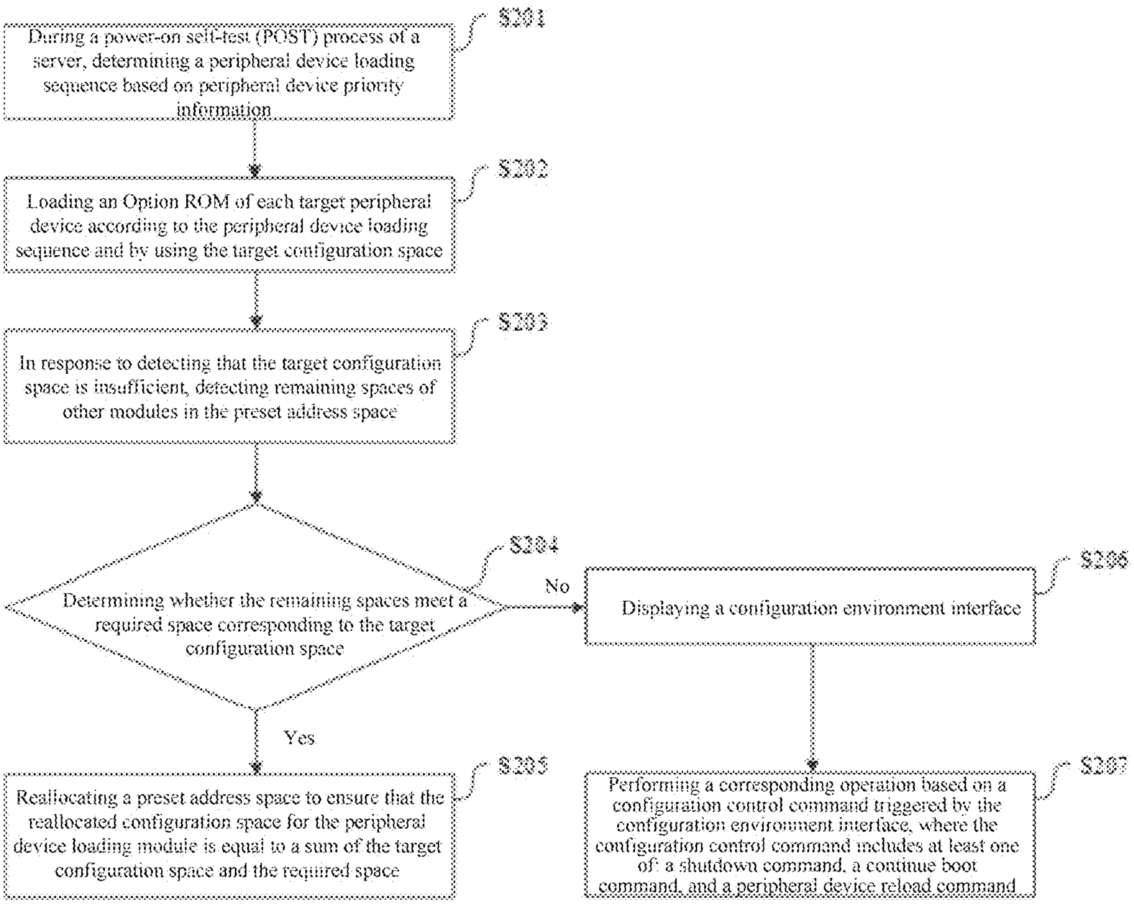
FIG. 3 is a flow chart of another server boot and operation method provided by some embodiments of the present application.

It should be noted that the present embodiment demonstrates the reallocation of the preset address space when the configuration space (i.e., the target configuration space) of the peripheral device loading module under a Legacy BIOS boot mode is insufficient. However, in a case where the configuration spaces of other modules are insufficient, similar or identical methods as provided in the present embodiment may be adopted to adjust the preset address space to maximize the utilization of limited internal memory resources. This is not limited in the present embodiment. In the present embodiment, by reallocation of the preset address space, it is ensured that the reallocated configuration space for the peripheral device loading module is greater than or equal to the sum of the target configuration space and the required space. In a case where the configuration space of the peripheral device loading module is insufficient, internal memory resources are reintegrated, reallocated, and loaded based on actual utilization of allocated configuration space for each module. In this way, the utilization of limited internal memory resources is maximized and the occurrence of peripheral device malfunction caused by insufficient internal memory resources allocated to Option ROMs of the peripheral devices under the conventional boot mode is reduced. Based on the above embodiments, the present application further provides another server boot and operation method, which enables loaded peripheral devices to better meet user requirements and ensure normal operation of key peripheral devices. In some embodiments, refer to FIG. 3, which is a flow chart of another server boot and operation method provided by some embodiments of the present application. The method may include:

Step 201: During a power-on self-test (POST) process of a server, determining a peripheral device loading sequence based on peripheral device priority information.

The peripheral device priority information may include priority information of various types of peripheral devices connected to the server.

It should be understood that in the present embodiment, the peripheral device priority information may be preset priority information of each type of peripheral device that may be connected to the server. This allows a BIOS of the server to configure a loading sequence of OPROMs (expansion memories) of peripheral devices (i.e., PCIe devices) based on the peripheral device priority information.

Correspondingly, the method provided by the present embodiment may further include a process of acquiring the peripheral device priority information. For example, when a single type of preset priority information is configured, the BIOS may directly acquire the preset priority information as the peripheral device priority information. When a plurality of types of preset priority information are configured, the BIOS may select and acquire one type of preset priority information from the plurality of types of preset priority information as the peripheral device priority information. For example, when different preset priority information is configured in advance for various server models (i.e., preset models), the BIOS may determine a target model of the server based on acquired model information of the server. The target model of the server is any preset model, and the target model of the server includes a computer model and a storage model. The preset priority information corresponding to the target model of the server may be determined as the peripheral device priority information. Furthermore, the BIOS may also determine the target model of the server based on both the model information of the server and service scenario information.

For example, based on a basic configuration model of the server, servers may be categorized into a computer model, a storage model, and a hybrid model. Each models focus on different application requirements and therefore have different requirements for peripheral devices. Accordingly, the preset priority information may be configured for each model according to user and model requirements to enable different peripheral device loading sequences for different models. For instance, the computer model prioritizes requirements for network interface cards (NICs), while having relatively low requirements for storage devices such as serial over LAN (SOL) and serial attached SCSI (SAS). Therefore, in the preset priority information corresponding to the computer model, the priorities of device types that need to be loaded, such as a video graphics array (VGA), onboard network interface cards, add-in NICs, SAS cards, RAID cards, onboard RAID, and Serial over LAN (SOL), may be configured in a descending sequence. This allows the corresponding peripheral device loading sequence to be VGA→onboard NICs→add-in NICs→SAS cards→RAID cards→onboard RAID→SOL, thereby enabling the automatic adjustment of the loading sequence for a plurality of network interface cards. The storage model prioritizes requirements for the storage devices, while having relatively low requirements on devices such as SOL and the network interface cards. Thus, in the preset priority information corresponding to the storage model, the priorities of device types such as VGA, SAS cards, RAID cards, onboard RAID, onboard network interface cards, add-in network interface cards, and SOL may be configured in a descending sequence; and consequently, the corresponding peripheral device loading sequence may be VGA→SAS cards→RAID cards→onboard RAID→onboard network interface cards→add-in network interface cards→SOL, thereby enabling automatic adjustment of the loading sequence for a plurality of network interface cards. For models with no requirements (i.e., the hybrid model), corresponding preset priority information may not be configured. In such cases, peripheral devices may be loaded according to a default loading sequence of the BIOS. In other words, in the preset priority information corresponding to the computer model, various network interface card (NICs) devices may be assigned higher priorities. In the preset priority information corresponding to the storage model, device types such as SAS cards and non-volatile memory express (NVMe) devices may be assigned higher priorities. For scenarios where there is no requirement for SOL application, SOL may be directly disabled without being loaded, thereby saving resources. That is, in the peripheral device priority information (i.e., the preset priority information) in this step, the priority information of various types of peripheral devices connected to the server may include priority information of each device type to be loaded, as well as information of each device type to be disabled (such as, SOL disablement information). For example, the model information may be field replaceable unit information (FRU info) unique to the model. Upon power-up and startup of the server, the BIOS may determine the target model based on the FRU information of the server. Then, according to the preset priority information of the target model (i.e., the peripheral device priority information), the BIOS configures the peripheral device loading sequence.

Step 202: Loading an Option ROM of each target peripheral device according to the peripheral device loading sequence and by using a target configuration space.

The target configuration space refers to a configuration space allocated to a peripheral device loading module in a preset address space, and the target peripheral devices refer to peripheral devices, among all peripheral devices connected to the server, that correspond to the peripheral device loading sequence.

It should be understood that this step is similar to Step 101, and will not be elaborated herein.

Step 203: In response to detecting that the target configuration space is insufficient, detecting remaining spaces of other modules in the preset address space.

Correspondingly, in a case where the target configuration space is insufficient is not detected, a subsequent POST process may be resumed, such as entering an operating system (OS) or a preboot execution environment (PXE). This is not limited in the present embodiment.

Step 204: Determining whether the remaining spaces meet a required space corresponding to the target configuration space; in response to determining that the remaining spaces meet the required space corresponding to the target configuration space, proceeding to Step 205; and in response to determining that the remaining spaces do not meet the required space corresponding to the target configuration space, proceeding to Step 206.

The required space refers to an address space needed by the target peripheral devices that have not yet been loaded. For example, in this step, whether a sum of remaining spaces is greater than the required space may be determined; in response to determining that the sum of remaining spaces is greater than the required space, it is determined that the remaining spaces meet the required space corresponding to the target configuration space; and in response to determining that the sum of remaining spaces is not greater than the required space, it is determined that the remaining spaces do not meet the required space corresponding to the target configuration space.

Step 205: Reallocating a preset address space to ensure that the reallocated configuration space for the peripheral device loading module is equal to a sum of the target configuration space and the required space.

It should be understood that in this step, in response to determining that the remaining spaces meet the required space corresponding to the target configuration space, the BIOS may reallocate a preset address space to ensure that the reallocated configuration space for the peripheral device loading module is equal to the sum of the target configuration space and the remaining spaces and ensure that the reallocated configuration space for the peripheral device loading module meets requirements for loading of Option ROMs of all target peripheral devices.

Figure 4:
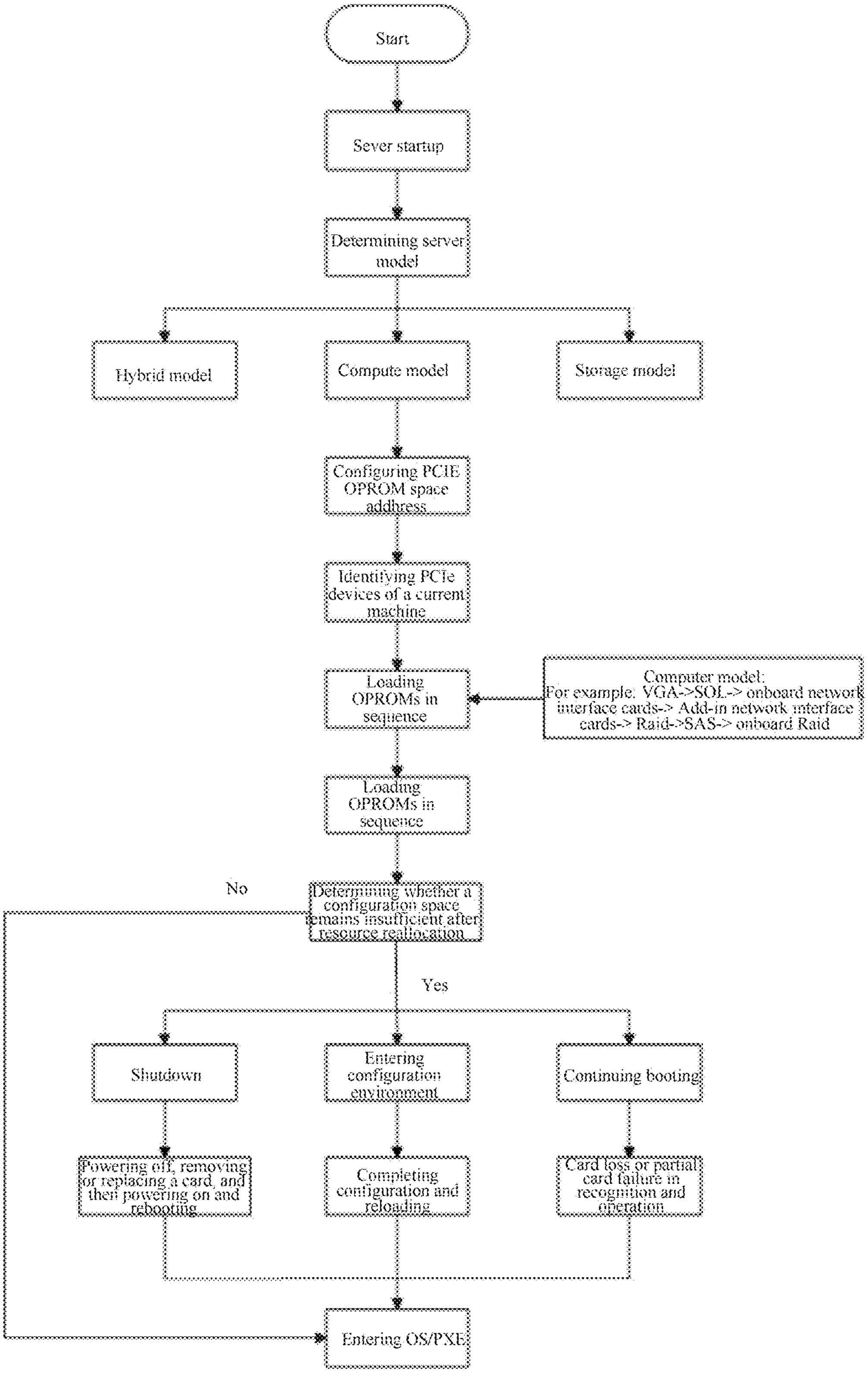
FIG. 4 is a schematic flow chart of another server boot and operation method provided by some embodiments of the present application.

Furthermore, in the present embodiment, after the preset address space is reallocated to ensure the reallocated configuration space for the peripheral device loading module is equal to the sum of the target configuration space and the remaining space, in response to detecting again that the reallocated configuration space for the peripheral device loading module is insufficient, a configuration environment interface may be displayed and a corresponding operation may be performed based on a configuration control command triggered by the configuration environment interface. As shown in FIG. 4, an operation selected from initiating a server shutdown procedure, entering a configuration environment to display the configuration environment interface, and continue boot (go on) may be executed according to a preset rule; additionally, a BIOS boot mode may be switched, for example, from a Legacy boot mode (a conventional boot mode) to a unified extensible firmware interface (UEFI) boot mode.

Step 206: Displaying the configuration environment interface.

In this step, the BIOS, in response to determining that the remaining spaces do not meet the required space corresponding to the target configuration space, may display the configuration environment interface, whereby the user or an administrator may trigger a corresponding configuration control command based on requirements to control a subsequent boot process.

Correspondingly, in the present embodiment, the BIOS, in response to determining that the remaining spaces do not meet the required space corresponding to the target configuration space, may directly display the configuration environment interface. In some embodiments, the BIOS, in response to determining that the remaining spaces do not meet the required space corresponding to the target configuration space, may acquire an insufficient space control command, and if the acquired command is an entry configuration environment command, displays the configuration environment interface. In response to determining that the acquired insufficient space control command is a shutdown command, the BIOS control a server to be shut down, whereby the user may manually remove or replace cards and adjust peripheral devices after power-off of the server, and then the server may enter the OS or PXE upon the next power-on and startup. In response to determining that the acquired insufficient space control command is a continue boot command, the BIOS abandons unloaded peripheral devices and continues a subsequent power-on self-test (POST) process, such as entering the OS or PXE.

Figure 5:
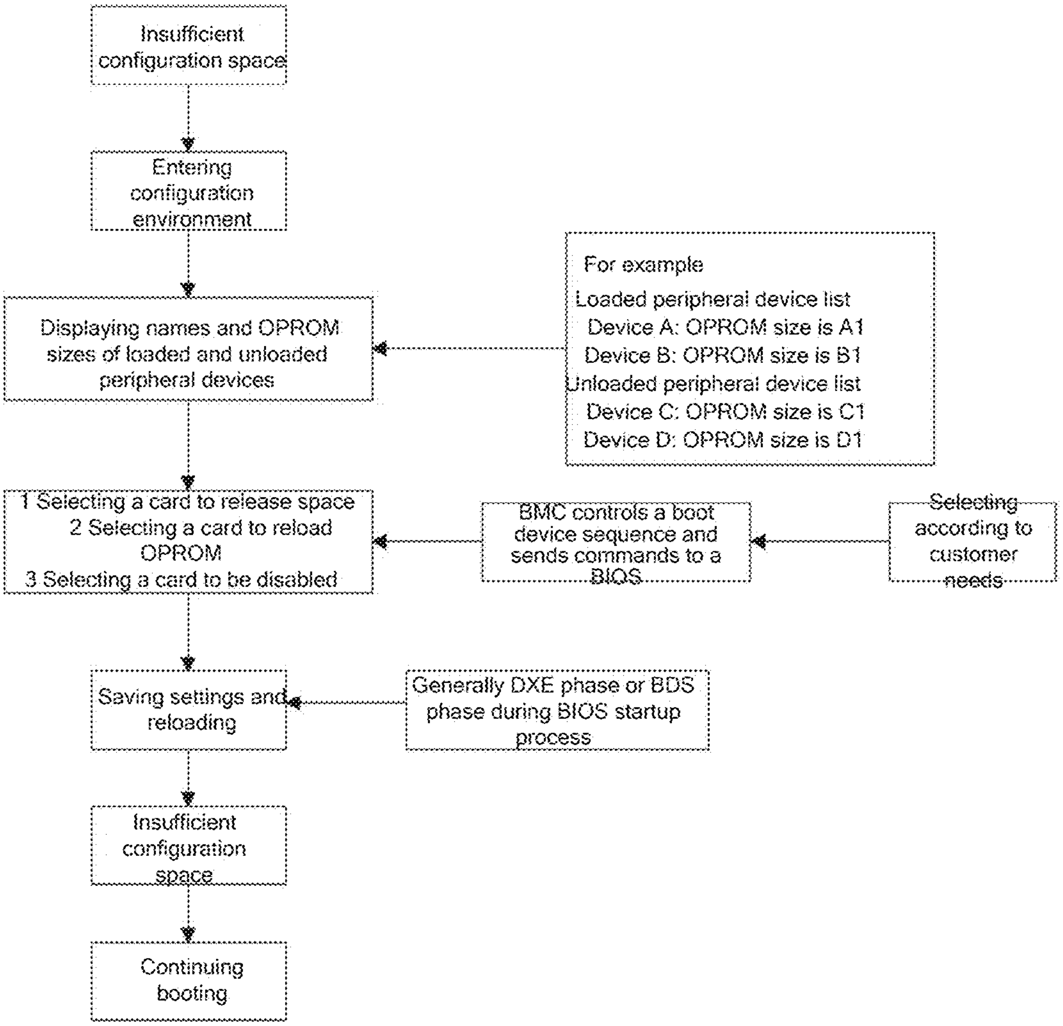
FIG. 5 is a schematic diagram of a configuration process of a configuration environment interface in a server boot and operation method provided by some embodiments of the present application.

Correspondingly, the method for acquiring the insufficient space control command described above may be set by the designers. For example, the BIOS may directly acquire the insufficient space control command, that is, the insufficient space control command may be a preset command that is to be executed when the remaining spaces do not meet the required space corresponding to the target configuration space, such as commands previously set in the configuration environment interface. In this way, during the reloading of Option ROMs in the target configuration space, when it is detected again that the target configuration space is insufficient, the BIOS may directly abandon the unloaded peripheral devices and continue the boot process. As shown in FIG. 5, during the process in which the BIOS reloads the option ROMs in the target configuration space at a driver execution environment (DXE) phase or a boot device selection (BDS) phase, the BIOS, in response to detecting that the target configuration space is still insufficient, may directly abandon the unloaded peripheral devices and continue the boot process. In some embodiments, the BIOS may generate an insufficient space control command based on priority information of unloaded target peripheral devices in peripheral device priority information. If priorities of the device types of unloaded peripheral devices are lower than a preset threshold, a generated insufficient space control command may be a continue boot command. If the priorities of the device types of unloaded peripheral devices are greater than or equal to a preset threshold, a generated insufficient space control command may be an entry configuration environment command.

It may be understood that the method for displaying the configuration environment interface in this step may be set by the designers based on practical scenarios and user requirements. For example, the BIOS may directly display the configuration environment interface on a display device of the server. In some embodiments, the BIOS may display the configuration environment interface on a remote terminal via a baseboard management controller (BMC), that is, the configuration environment interface may be presented on the webpage of the remote terminal to enable out-of-band configuration control. Accordingly, the BIOS may receive the configuration control command triggered by the configuration environment interface through the BMC.

It may be noted that display content of the configuration environment interface in these embodiments may be set by the designers based on practical scenarios and user requirements. As shown in FIG. 5, the configuration environment interface may include a loaded peripheral device list and an unloaded peripheral device list. The loaded peripheral device list may include device information (e.g., names) and Option ROM (OPROM) size information of each loaded peripheral device. The unloaded peripheral devices may include device information and Option ROM (OPROM) size information of all or part of the unloaded peripheral devices (e.g., target peripheral devices). This allows the user, via the configuration environment interface, to conveniently select and configure cards to release space (i.e., loaded peripheral devices to be discarded), cards whose OPROMs need to be reloaded (i.e., peripheral devices to be loaded in subsequent steps), and cards to be disabled (i.e., unloaded peripheral devices to be discarded), thereby triggering a peripheral device reload command. Through warning display of the loaded peripheral device list and the unloaded peripheral device list in the configuration environment interface, selectable loading sequence optimization is provided, thereby maximizing freedom of choice and ease of use of the user.

That is, when the configuration control command triggered by the configuration environment interface includes the peripheral device reload command, the peripheral device reload command may include information of the peripheral devices to be loaded and information of the peripheral devices to be discarded, and the information of the peripheral devices to be discarded includes device information of loaded peripheral devices.

Correspondingly, in the present embodiment, when the remaining spaces do not meet the required space corresponding to the target configuration space, the preset address space is not reallocated. This is because, even if reallocation is performed, some target peripheral devices may still fail to load and therefore may not function properly. In such cases, additionally loadable peripheral devices enabled by reallocation of the preset address space may not be the ones that the user actually needs. In other embodiments, before Step 206, whether a reallocation of the preset address space has already been performed may be detected. In response to detecting that the reallocation of the preset address space has already been performed once, Step 206 is performed. In response to detecting that before Step 206, no reallocation of the preset address space has been performed, the reallocation of the preset address space is performed so as to provide more space resources for subsequent configuration in the configuration environment interface. This is not limited in the present embodiment.

Step 207: Performing a corresponding operation based on a configuration control command triggered by the configuration environment interface, where the configuration control command includes at least one of: a shutdown command, a continue boot command, and a peripheral device reload command.

It may be understood that in the present embodiment, after the BIOS displays the configuration environment interface, a user or an administrator may, based on requirements, perform selection and configuration operations by the configuration environment interface to trigger the configuration control command to control the subsequent boot process.

The configuration control command that may be triggered by the configuration environment interface may include: a shutdown command, by which the BIOS, in response to determining that the configuration control command triggered by the configuration environment interface is the shutdown command, controls a server to shut down; the configuration control command that may be triggered by the configuration environment interface may include a continue boot command, by which the BIOS, in response to determining that the configuration control command triggered by the configuration environment interface is the continue boot command, abandons unloaded peripheral devices, and continues the subsequent POST process, such as entering the OS or the PXE; the configuration control command that may be triggered by the configuration environment interface may further include a peripheral device reload command, by which the BIOS, in response to determining that the configuration control command triggered by the configuration environment interface is the peripheral device reload command, reloads the Option ROMs in the target configuration space based on information of peripheral devices to be loaded and information of peripheral devices to be discarded as specified in the peripheral device reload command; and the configuration control command that may be triggered by the configuration environment interface may further include a boot mode switching command, by which the BIOS, in response to determining that the configuration control command triggered by the configuration environment interface is the boot mode switching command, switches a BIOS boot mode according to the boot mode switching command, for example, switching the BIOS boot mode from the Legacy boot mode to the UEFI boot mode.

Correspondingly, in a case where the BIOS, in response to determining that the configuration control command triggered by the configuration environment interface is the peripheral device reload command, reloads the Option ROMs in the target configuration space based on the information of peripheral devices to be loaded and information of peripheral devices to be discarded, in response to determining that the target configuration space is insufficient during reloading, the BIOS may directly abandon the unloaded peripheral devices and continue the subsequent POST process. In some embodiments, the system may return to Step 203. This is not limited in the present embodiment.

For example, if a server is configured as a storage model, the server has a high demand for storage disks, requiring a plurality of SAS cards and RAID cards for expansion, while also needing network interface cards (NICs) for system installation. If a RAID card is used as a system disk and an insufficient space occurs, the user may temporarily disable the SAS cards and redundant NICs by the configuration environment interface, retain the RAID card and a single NIC to ensure proper NIC functionality. This allows entry into the PXE environment to install an operating system onto the storage disk on the RAID card. After installation is complete, during the subsequent reboot process, the user may either ignore the loading of NIC and SOL OPROMs (i.e., follow the peripheral device loading sequence for storage model during the reboot process), or may perform out-of-band loading sequence optimization via the configuration environment interface. That is, the user may select peripheral devices to load and a loading sequence based on the application requirements, or set certain devices to be disabled. In this way, the insufficient space will not occur during reboot and requirements of the user for an application scenario may be met.

In the present embodiment, the configuration of the peripheral device priority information and the configuration environment interface enables the loading of peripheral devices to better meet user requirements and ensures that the key peripheral devices may operate normally.

Corresponding to the above method embodiment, the present application further provides a server boot and operation apparatus. The server boot operation apparatus described below may be referenced in conjunction with the server boot operation method described above.

Figure 6:
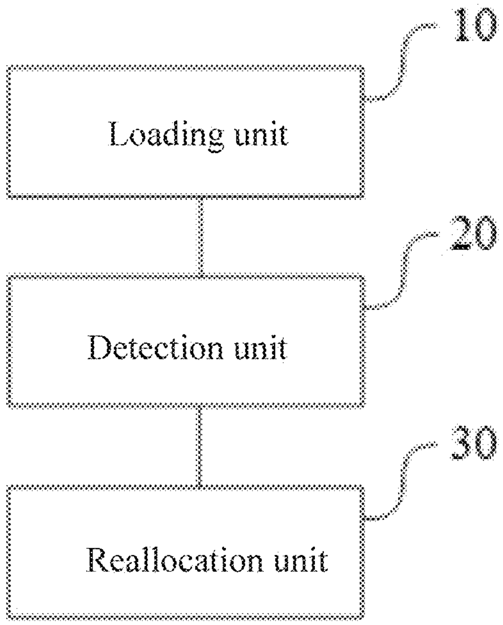
FIG. 6 is a structural block diagram of a server boot and operation apparatus provided by some embodiments of the present application.

Refer to FIG. 6, which is a structural block diagram of a server boot and operation apparatus provided by some embodiments of the present application. The apparatus may include:

- a loading unit 10, configured to, during a POST process of a server, load an Option ROM of each target peripheral device according to a peripheral device loading sequence and by using target configuration space, where the target configuration space refers to a configuration space allocated to a peripheral device loading module in a preset address space, and the target peripheral devices refer to peripheral devices, among all peripheral devices connected to the server, that correspond to the peripheral device loading sequence;

a detection unit 20, configured to, in response to detecting that the target configuration space is insufficient, detect remaining spaces of other modules in the preset address space; and a reallocation unit 30, configured to, in response to determining that the remaining spaces meet a required space corresponding to the target configuration space, reallocate a preset address space to ensure that the reallocated configuration space for the peripheral device loading module is greater than or equal to a sum of the target configuration space and the required space, where the required space refers to an address space needed by the target peripheral devices that have not yet been loaded.

In some embodiments, the apparatus may further include:

a configuration display unit, configured to, in response to determining that the remaining spaces do not meet the required space, display a configuration environment interface; and a configuration execution unit, configured to execute a corresponding operation based on a configuration control command triggered by the configuration environment interface, where the configuration control command includes at least one of: a shutdown command, a continue boot command, and a peripheral device reload command.

In some embodiments, the configuration display unit may include:

a command acquisition subunit, configured to, in response to determining that the remaining spaces do not meet the required space, acquire an insufficient space control command;

a display subunit, configured to, in response to determining that the insufficient space control command is an entry configuration environment command, display the configuration environment interface;

a shutdown subunit, configured to, in response to determining that the insufficient space control command is a shutdown command, control the server to shut down; and a continue boot subunit, configured to, in response to determining that the insufficient space control command is a continue boot command, abandon unloaded peripheral devices and continue a subsequent POST process.

In some embodiments, the command acquisition subunit may be configured to generate an insufficient space control command based on the priority information of unloaded target peripheral devices in peripheral device priority information; and the peripheral device priority information includes the priority information of various types of peripheral devices connected to the server.

In some embodiments, the configuration display unit may be configured to display the configuration environment interface on a remote terminal via a baseboard management controller.

In some embodiments, the configuration environment interface includes a loaded peripheral device list and an unloaded peripheral device list. The loaded peripheral device list includes device information and option ROM size information of the loaded peripheral devices.

In some embodiments, when the configuration control command includes a peripheral device reload command, the peripheral device reload command includes information of peripheral devices to be loaded and information of peripheral devices to be discarded. The information of peripheral devices to be discarded includes the device information of the loaded peripheral devices.

In some embodiments, the configuration execution unit may include:

a reload subunit, configured to, in response to determining that the configuration control command is a peripheral device reload command, reload the option ROMs in the target configuration space based on the information of peripheral devices to be loaded and the information of peripheral devices to be discarded;

an abort subunit, configured to, in response to detecting that the target configuration space is insufficient during a reloading process, abandon the unloaded peripheral devices and continue the subsequent power-on self-test process.

In some embodiments, the reallocation unit 30 may also be configured to, after a preset address space is reallocated to ensure that the reallocated configuration space for the peripheral device loading module is greater than or equal to a sum of the target configuration space and the required space, in response to detecting that the reallocated configuration space of the peripheral device loading module is insufficient, transmit a boot signal to the configuration display unit.

In some embodiments, the reallocation unit 30 may be configured to reallocate the preset address space to ensure that the reallocated configuration space for the peripheral device loading module is equal to the sum of the target configuration space and the remaining space.

In some embodiments, the loading unit 10 may include:

a sequence determination subunit, configured to determine an external loading sequence based on peripheral device priority information; where the peripheral device priority information includes priority information of various types of peripheral devices connected to the server; and a sequence loading subunit, configured to load an option ROM of each target peripheral device in the target configuration space according to the external loading sequence.

In some embodiments, the sequence determination subunit may be configured to determine a target model of the server based on the acquired model information of the server, and determine the preset priority information corresponding to the target model of the server as the peripheral device priority information, where the target model of the server may be any one of the preset models, and the preset models include a computer model and storage model.

In some embodiments, the priority information of various types of peripheral devices connected to the server includes priority information of the device types to be loaded and information of the device types to be disabled.

In the present embodiment, the reallocation unit 30 is configured to reallocate the preset address space to ensure that the reallocated configuration space for the peripheral device loading module is greater than or equal to the sum of the target configuration space and the required space. In a case where the configuration space of the peripheral device loading module is insufficient, internal memory resources may be reintegrated, reallocated, and loaded based on actual utilization of an allocated configuration space for each module. In this way, the utilization of limited internal memory resources is maximized and the occurrence of peripheral device malfunction caused by insufficient internal memory resources allocated to Option ROMs of the peripheral devices in conventional boot mode is reduced.

Corresponding to the above method embodiment, the present application further provides a server, which may be referenced in conjunction with the above server boot and operation method.

Figure 7:
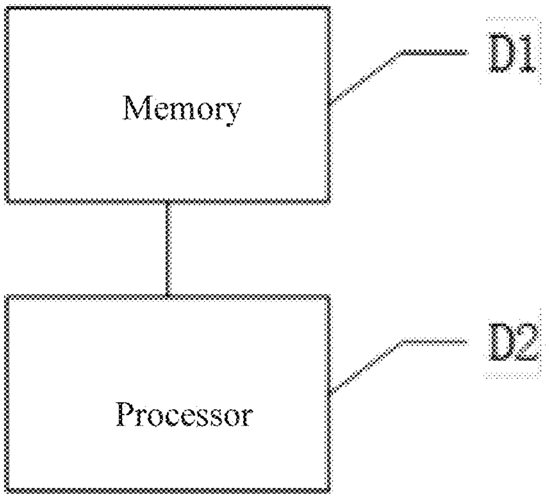
FIG. 7 is a schematic structural diagram of a server provided by some embodiments of the present application.

Refer to FIG. 7, which is a schematic structural diagram of a server provided by some embodiments of the present application. The server may include one or more processors D2, and a memory D1 associated with the one or more processors D2. The memory D1 is configured to store computer-readable instructions. When executed by the one or more processors D2, the instructions implement the steps of the server boot and operation method provided by the above method embodiments.

Corresponding to the above method embodiments, the present application further provides a non-transitory computer-readable storage medium. The non-transitory computer-readable storage medium described below may be referred to in conjunction with the server boot and operation method described above.

Figure 8:
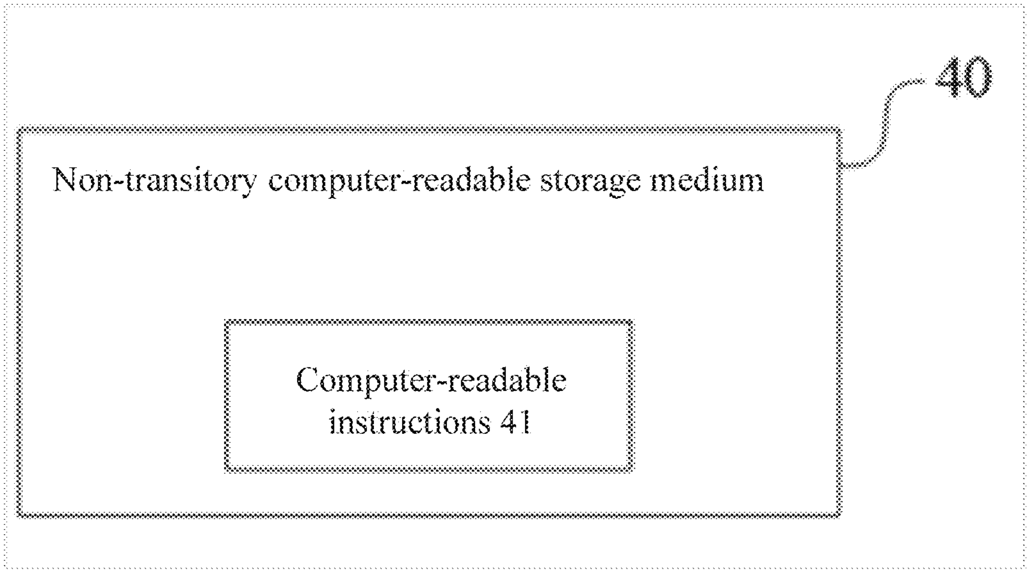
FIG. 8 is a schematic structural diagram of a computer-readable storage medium provided by some embodiments of the present application.

Refer to FIG. 8, which is a schematic structural diagram of a non-transitory computer-readable storage medium provided by some embodiments of the present application. The non-transitory computer-readable storage medium 40 stores computer-readable instructions 41. When executed by one or more processors, the computer-readable instructions 41 implement the steps of the server boot and operation method provided by the above-mentioned method embodiments.

The embodiments in the specification are described in a progressive manner. Each embodiment focuses on the differences from other embodiments, and the similar or identical parts among the embodiments may be referred to mutually. As the apparatuses, servers, and computer-readable storage media disclosed in the embodiments correspond to the methods disclosed in the embodiments, their descriptions are relatively brief. Relevant details may be referred to in the method embodiment.

The above provides a detailed description of the server boot and operation method and apparatus, the server, and the non-transitory computer-readable storage medium provided by the present application. Examples are used herein to illustrate the principles and implementations of the present application. The explanations of the above embodiments are intended solely to facilitate understanding of the method and core concepts of the present application. It should be noted that a person skilled in the art may make various modifications and improvements to the present application without departing from its principles, and such modifications and improvements shall also fall within the scope of protection defined by the claims of the present application.

The invention claimed is:

1. A server boot and operation method, comprising:

during a power-on self-test (POST) process of a server, allocating configuration space to a peripheral device loading module and other modules by using a fixed-size address space, making the peripheral device loading module allocated to a target configuration space, and the other modules allocated to a preset configuration space;

loading an Option ROM of each of target peripheral devices according to a peripheral device loading sequence and by using the target configuration space, wherein the target configuration space refers to a configuration space allocated to the peripheral device loading module in a preset address space, and the target peripheral devices refer to peripheral devices, among all peripheral devices connected to the server, that correspond to the peripheral device loading sequence;

in response to detecting that the target configuration space is insufficient, detecting remaining spaces within the preset configuration space allocated to the other modules after corresponding content of the other modules is loaded;

in response to determining that the remaining spaces meet a required space corresponding to the target configuration space, reallocating the preset address space to ensure that the reallocated configuration space for the peripheral device loading module is greater than or equal to a sum of the target configuration space and the required space, wherein the required space refers to an address space needed by the target peripheral devices that have not yet been loaded;

in response to determining that the remaining spaces do not meet the required space, displaying a configuration environment interface; and performing a corresponding operation based on a configuration control command triggered by the configuration environment interface, wherein the configuration control command comprises at least one of: a shutdown command, a continue boot command, and a peripheral device reload command;

wherein before the loading an Option ROM of each of target peripheral devices according to a peripheral device loading sequence, the method further comprises:

determining a target model of the server based on acquired model information of the server;

determining priority information of various types of the peripheral devices connected to the server based on the target model, the priority information of the various types of the peripheral devices connected to the server comprising priority information of each device type to be loaded and information of each device type to be disabled; and determining the peripheral device loading sequence based on the priority information of the various types of the peripheral devices connected to the server.

2. The server boot and operation method according to claim 1, wherein before the displaying a configuration environment interface, the method further comprises:

acquiring an insufficient space control command;

in response to determining that the insufficient space control command is an entry configuration environment command, performing a step of displaying the configuration environment interface;

in response to determining that the insufficient space control command is the shutdown command, controlling the server to shut down; and in response to determining that the insufficient space control command is the continue boot command, abandoning unloaded peripheral devices and continuing a subsequent POST process.

3. The server boot and operation method according to claim 2, wherein the acquiring an insufficient space control command comprises:

generating the insufficient space control command based on priority information of unloaded target peripheral devices in peripheral device priority information, wherein the peripheral device priority information comprises the priority information of the various types of the peripheral devices connected to the server.

4. The server boot and operation method according to claim 1, wherein the displaying a configuration environment interface comprises:

displaying the configuration environment interface on a remote terminal via a baseboard management controller.

5. The server boot and operation method according to claim 1, wherein the configuration environment interface comprises a loaded peripheral device list and an unloaded peripheral device list, wherein the loaded peripheral device list comprises device information and Option ROM size information of loaded peripheral devices.

6. The server boot and operation method according to claim 1, wherein when the configuration control command comprises the peripheral device reload command, the peripheral device reload command comprises information of peripheral devices to be loaded and information of peripheral devices to be discarded, wherein the information of peripheral devices to be discarded comprises device information of loaded peripheral devices.

7. The server boot and operation method according to claim 6, wherein the performing a corresponding operation based on a configuration control command triggered by the configuration environment interface comprises:

in response to determining that the configuration control command is the peripheral device reload command, reloading the Option ROM in the target configuration space according to the information of peripheral devices to be loaded and the information of peripheral devices to be discarded; and in response to determining that the target configuration space is insufficient during a reloading process, abandoning unloaded peripheral devices and continuing a subsequent POST process.

8. The server boot and operation method according to claim 1, wherein after the reallocating the preset address space to ensure that the reallocated configuration space for the peripheral device loading module is greater than or equal to a sum of the target configuration space and the required space, the method further comprises:

in response to detecting that the reallocated configuration space for the peripheral device loading module is insufficient, displaying the configuration environment interface.

9. The server boot and operation method according to claim 1, wherein the reallocating the preset address space to ensure that the reallocated configuration space for the peripheral device loading module is greater than or equal to a sum of the target configuration space and the required space comprises:

reallocating a present address space to ensure that the reallocated configuration space for the peripheral device loading module is equal to a sum of the target configuration space and the remaining spaces.

10. The server boot and operation method according to claim 1, wherein after the determining a target model of the server based on acquired model information of the server, the method further comprises:

determining preset priority information corresponding to the target model of the server as the priority information of the various types of the peripheral devices connected to the server.

11. The server boot and operation method according to claim 10, wherein the determining a target model of the server based on acquired model information of the server further comprises:

acquiring service scenario information of the server; and determining the target model of the server based on the acquired model information and the service scenario information.

12. The server boot and operation method according to claim 10, wherein before the determining preset priority information corresponding to the target model of the server as the priority information of the various types of the peripheral devices connected to the server, the method further comprises:

acquiring requirements of the target model of the server for the peripheral devices; and determining the preset priority information corresponding to the target model based of the server on the requirements.

13. The server boot and operation method according to claim 10, wherein the determining a target model of the server based on acquired model information of the server comprises:

acquiring field replaceable unit information; and determining the target model of the server based on the field replaceable unit information.

14. The server boot and operation method according to claim 1, wherein before the loading an Option ROM of each of target peripheral devices according to a peripheral device loading sequence and by using the target configuration space, the method further comprises:

in response to determining that the server is powered on, allocating the target configuration space for the peripheral device loading module according to a resource allocation method and by using the preset address space.

15. The server boot and operation method according to claim 1, wherein after the loading an Option ROM of each of target peripheral devices according to a peripheral device loading sequence and by using the target configuration space, the method further comprises:

in response to not detecting that the target configuration space is insufficient, entering an operating system or a pre boot execution environment.

16. A server, comprising:

memory, used for storing computer programs; and a processor for implementing steps of starting and running a server, the steps comprising:

during a power-on self-test (POST) process of the server, allocating configuration space to a peripheral device loading module and other modules by using a fixed-size address space, making the peripheral device loading module allocated to a target configuration space, and the other modules allocated to a preset configuration space;

loading an Option ROM of each of target peripheral devices according to a peripheral device loading sequence and by using the target configuration space, wherein the target configuration space refers to a configuration space allocated to the peripheral device loading module in a preset address space, and the target peripheral devices refer to peripheral devices, among all-peripheral devices connected to the server, that correspond to the peripheral device loading sequence;

in response to detecting that the target configuration space is insufficient, detecting remaining spaces within the preset configuration space allocated to the other modules after corresponding content of the other modules is loaded;

in response to determining that the remaining spaces meet a required space corresponding to the target configuration space, reallocating the preset address space to ensure that the reallocated configuration space for the peripheral device loading module is greater than or equal to a sum of the target configuration space and the required space, wherein the required space refers to an address space needed by the target peripheral devices that have not yet been loaded;

in response to determining that the remaining spaces do not meet the required space, displaying a configuration environment interface; and performing a corresponding operation based on a configuration control command triggered by the configuration environment interface, wherein the configuration control command comprises at least one of: a shutdown command, a continue boot command, and a peripheral device reload command;

wherein before the loading an Option ROM of each of target peripheral devices according to a peripheral device loading sequence, the processor for implements steps further comprising:

determining a target model of the server based on acquired model information of the server;

determining priority information of various types of the peripheral devices connected to the server based on the target model, the priority information of the various types of the peripheral devices connected to the server comprising priority information of each device type to be loaded and information of each device type to be disabled; and determining the peripheral device loading sequence based on the priority information of the various types of the peripheral devices connected to the server.

17. A non-transitory computer-readable storage medium, comprising a computer program, which, when executed by a processor, implements steps of starting and running a server, the steps comprising:

during a power-on self-test (POST) process of the server, allocating configuration space to a peripheral device loading module and other modules by using a fixed-size address space, making the peripheral device loading module allocated to a target configuration space, and the other modules allocated to a preset configuration space;

loading an Option ROM of each of target peripheral devices according to a peripheral device loading sequence and by using the target configuration space, wherein the target configuration space refers to a configuration space allocated to the peripheral device loading module in a preset address space, and the target peripheral devices refer to peripheral devices, among all peripheral devices connected to the server, that correspond to the peripheral device loading sequence;

in response to detecting that the target configuration space is insufficient, detecting remaining spaces within the preset configuration space allocated to the other modules after corresponding content of the other modules is loaded;

in response to determining that the remaining spaces meet a required space corresponding to the target configuration space, reallocating the preset address space to ensure that the reallocated configuration space for the peripheral device loading module is greater than or equal to a sum of the target configuration space and the required space, wherein the required space refers to an address space needed by the target peripheral devices that have not yet been loaded;

in response to determining that the remaining spaces do not meet the required space, displaying a configuration environment interface; and performing a corresponding operation based on a configuration control command triggered by the configuration environment interface, wherein the configuration control command comprises at least one of: a shutdown command, a continue boot command, and a peripheral device reload command;

wherein before the loading an Option ROM of each of target peripheral devices according to a peripheral device loading sequence, the computer program when executed by the processor, implements steps further comprising:

determining a target model of the server based on acquired model information of the server;

determining priority information of various types of the peripheral devices connected to the server based on the target model, the priority information of the various types of the peripheral devices connected to the server comprising priority information of each device type to be loaded, and information of each device type to be disabled; and determining the peripheral device loading sequence based on the priority information of the various types of the peripheral devices connected to the server.

* * * * *